May 29, 1956   W. L. KELLY   2,748,045
METHOD OF MAKING MOLDED PLASTIC WASHING MACHINE AGITATOR
Filed Nov. 17, 1953   2 Sheets-Sheet 2
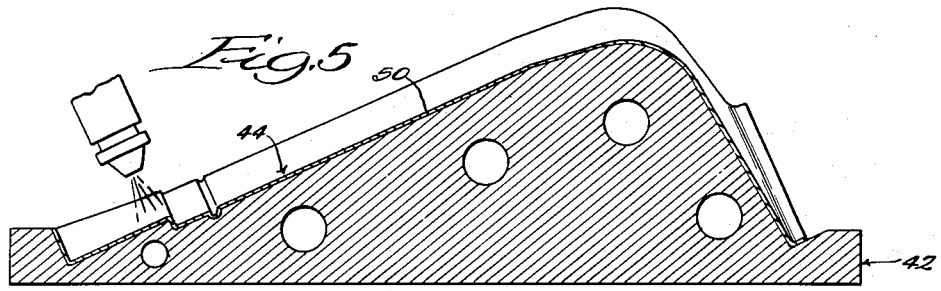
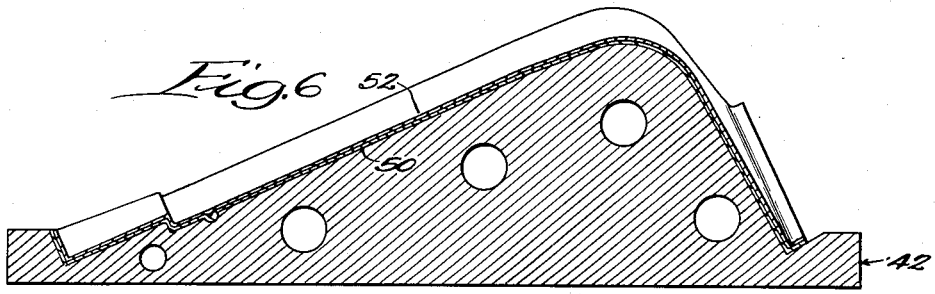
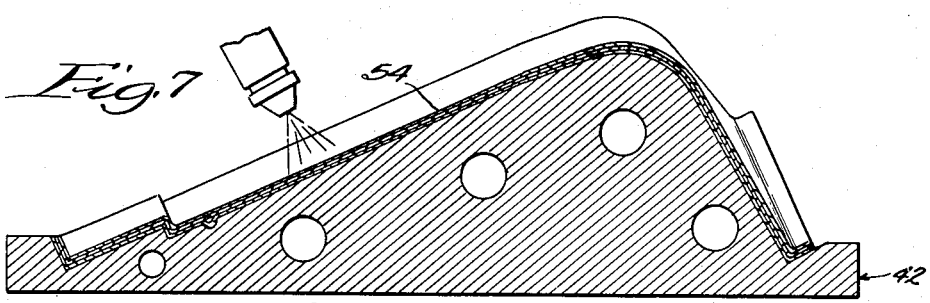
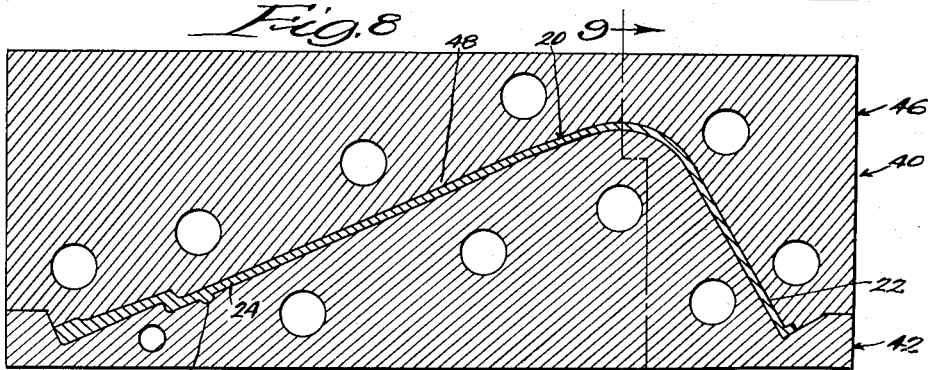
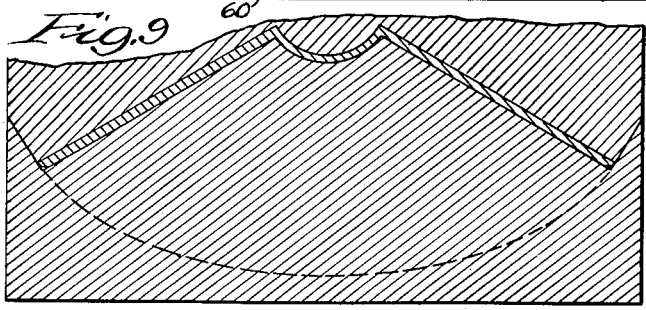
INVENTOR:
William L. Kelly.
BY
Owen, McDougall, Williams & Hersh.
ATTORNEYS.

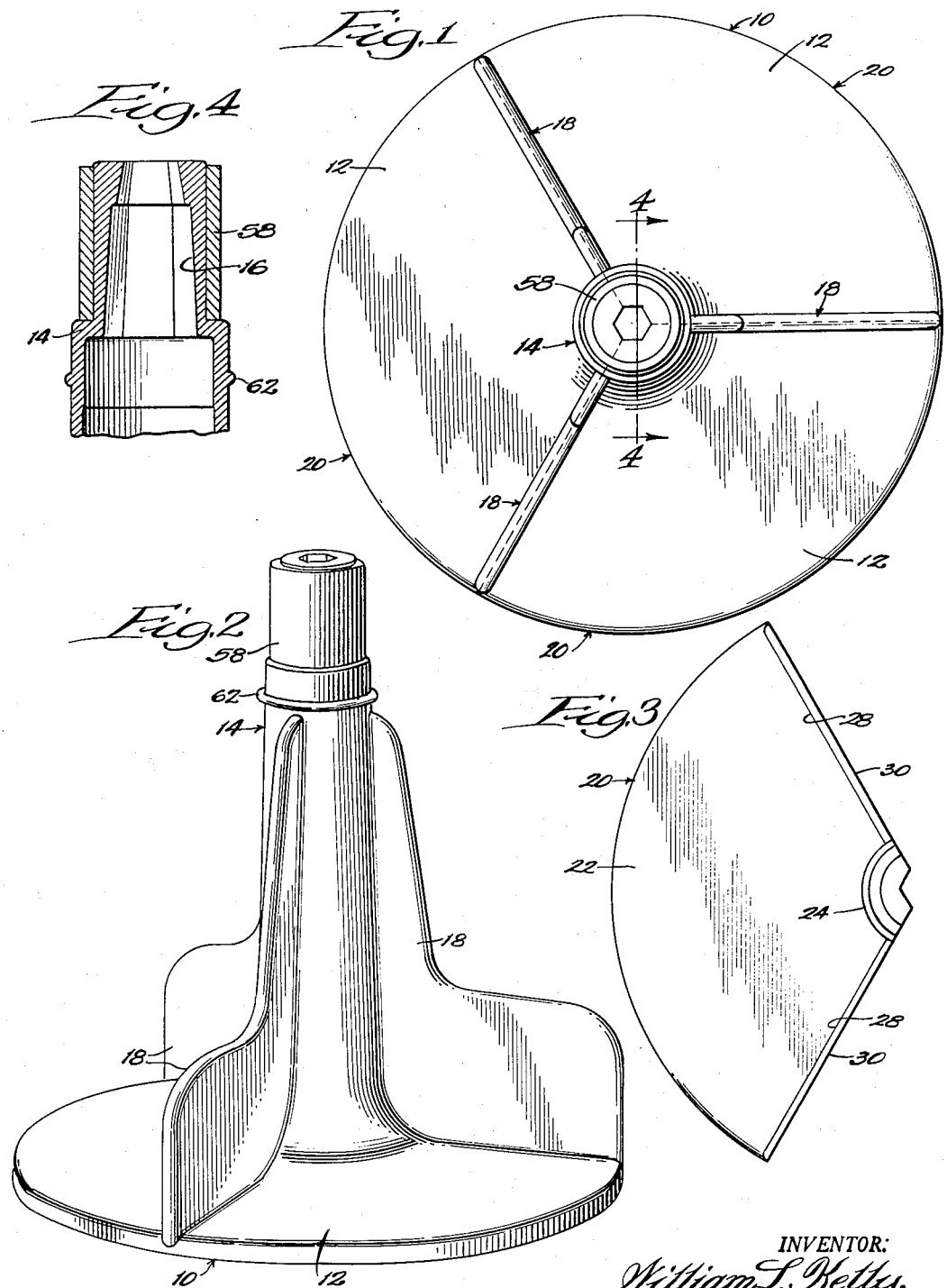

United States Patent Office 2,748,045
Patented May 29, 1956

2,748,045
METHOD OF MAKING MOLDED PLASTIC WASHING MACHINE AGITATOR

William L. Kelly, Chicago, Ill.

Application November 17, 1953, Serial No. 392,640

2 Claims. (Cl. 154—110)

This invention relates to molded plastic agitators for washing machines and also to a method for making such agitators.

Many of the agitators being employed at present in washing machines are molded in one piece from resins such as Bakelite. Such agitators are formed in an inverted position by employing a two-part mold, having a mold cavity extending downwardly into the lower part of the mold so as to form the central column and radial vanes of the agitator. It has long been desired to make pure white washing machine agitators, because the white color would greatly increase the salability of the washing machine. However, it is not feasible to produce Bakelite in a pure white color. Other types of resins which might be supplied in a pure white color are not mechanically satisfactory for use in washing machine agitators. Accordingly, most of the present plastic agitators are made of black Bakelite.

Various attempts have been made to produce agitators having a pure white plastic coating composed of a resinous material such as the product called "Gel-Cote," which is made and sold in liquid form by The Glidden Company. In some of these attempts, the plastic material has been applied initially to the agitator mold and then a resinous material having suitable mechanical properties has been added to form the body of the agitator. The attempted molding operation has then been completed by applying heat and pressure in the usual manner. However, in every case, the results obtained have been entirely unsatisfactory. Instead of remaining on the surface of the mold cavity in the lower part of the mold, the white resinous material has been forced into the lower portions of the mold cavity by gravity and the washing action of the subsequently added plastic material forming the body of the agitator. This results in bare spots in the finished white plastic coating and generally non-uniform distribution of the white resinous material on the outside of the agitator.

It is an object of the present invention to overcome these difficulties, experienced in the prior attempts to produce white plastic washing machine agitators.

A further object is to produce washing machine agitators having a uniform coating of a white resinous material.

Another object is to produce washing machine agitators of the foregoing character which are strong and durable, yet light in weight.

Still another object is to provide an agitator production method which may readily be carried out on a mass scale and which will be sufficiently economical to be commercially feasible.

Further objects and advantages of the invention will appear from the following description of an exemplary agitator and a particular method of making the agitator, the particular agitator and method being intended to illustrate but not to limit the invention. The description should be taken with the accompanying drawings, in which:

Figure 1 is a plan view of an exemplary washing machine agitator made in accordance with the present invention.

Figure 2 is a general perspective view of the agitator.

Figure 3 is a plan view of one of the sectors or sections which may be assembled to form the agitator of Figure 1.

Figure 4 is an elevational sectional view of the upper end of the agitator shown in Figure 1, the view being taken generally along a line 4—4 in Figure 1.

Figures 5–8 are elevational sectional views illustrating successive steps in a novel method of making the agitator section shown in Figure 3, the views being taken longitudinally through a mold employed in carrying out the method.

Figure 9 is a transverse sectional view taken through the mold shown in Figures 5–8 generally along a line 9—9 in Figure 8.

The drawings, considered in greater detail, illustrate an exemplary agitator in the form of a bell-shaped shell 10 having a lower skirt portion 12 surmounted by an upwardly extending central hub portion or column 14 having a hexagonally or otherwise non-circularly shaped internal wall 16 adapted to receive the correspondingly shaped upper end of a drive shaft on a washing machine. A plurality of vanes 18 extend radially from the column 14 and skirt portion 12, three such vanes being illustrated.

In order that the agitator 10 may be molded with a pure white resinous coating in accordance with the present invention, the agitator is composed of three identical angular sectors or sections 20 corresponding in number to the number of vanes. If a different number of vanes are employed, the agitator would be made in a different number of sectors or sections. For example, a two-vaned agitator would be made in two sections.

Each section 20 comprises a skirt portion 22 surmounted by a column portion 24. At its angularly related lateral edges, the section 20 is formed with a pair of half vanes 28. At one side each half vane 28 and the contiguous portion of the column section 24 terminate in a radial vertical wall 30 adapted to abut against a corresponding vertical radial wall 30 on another of the sections 20 so that three of the sections 20 may be assembled to form the complete agitator. When the agitator is thus assembled, each of the vanes 18 is composed of two of the half vanes 28 joined along a radial plane.

In accordance with the invention, each of the sections 20 is made of a resinous material and is formed with a white resinous coat. This is accomplished by utilizing a two-part mold 40 which is illustrated diagrammatically in the drawings. The two-part mold 40 comprises a lower part 42 having a mold cavity 44 conforming to the desired outer surface of the agitator section 20, the cavity being oriented so that the section 20 will be molded with its axis generally horizontal. Also included in the mold 40 is an upper part 46 having a projecting portion or die 48 in the form of the desired inner surface of the section 20.

To mold each section 20, the cavity 44 in the lower part of the mold 40 is coated with a thin layer 50 of a pure white resinous material such as that manufactured and sold as "Gel-Cote" No. 0536, by The Glidden Company. This material is designed to bond readily to other resinous materials. Preferably, the Gel-Cote is applied in liquid form with a spray gun. Although Gel-Cote is preferred, other materials may be used.

Since the mold surfaces to which the Gel-Cote is applied are approximately horizontal, it can be distributed uniformly, in a thin even coat, despite the fact that the Gel-Cote is applied as a liquid. Accordingly, it is a matter of some advantage to mold the sections 20 in a horizontal position, with the column portion 24 and the skirt portion 22 at approximately the same level. With this arrangement, there will be little or no tendency for the liquid Gel-Cote to flow into the lowest part of the mold cavity.

In order that the finished agitator may be strong and durable, a reinforcing mat 52 made of glass fiber is preferably applied to the lower part of the mold 40 over the Gel-Cote layer 50, the mat 52 preferably having been preformed so as to fit snugly into the mold cavity 44. Then a layer 54 of an impregnant is added to the mold cavity 44. The impregnant may be composed of a polyester resin, for example. If desired, the impregnant may be applied to the reinforcing mat 52 before it is inserted into the mold cavity 44. Preferably, however, the impregnant is applied in liquid form with a spray gun. It will be understood that other plastic materials may be employed instead of the glass fiber reinforced polyester resin.

The molding operation is completed by closing the lower and upper mold parts 42 and 46 so as to apply pressure to the materials in the mold. Heat is also applied to the resinous mass by maintaining the mold 40 at a temperature in the neighborhood of 250 to 275° Fahrenheit. After a short period of time, such as two minutes, for example, the heat and the pressure will amalgamate the Gel-Cote, the glass fiber mat 52 and the impregnant into an intimately bonded resinous mass forming the agitator section 20. The mold parts 42 and 46 may then be separated and the molded piece removed from the mold. Due to the horizontal orientation of the mold cavity and the absence of any deep crevices or sharp angles in the mold cavity, the mold section 20 will have a uniform, smooth, pure white surface on its outer side.

Because of the horizontal position of the mold 40, the glass fiber mat can readily be positioned in the mold. The molding of the vanes 18 in half sections also insures that the glass fiber mat will extend into all portions of the mold cavity.

There is no substantial tendency for the glass fiber or the impregnant to wash away or otherwise disturb the Gel-Cote layer during the molding operation. Such washing action is obviated by the horizontal position and shallowness of the mold. These same factors make it easy to mold the upper end of the column portion 24 with a heavier section than the skirt portion 22, as shown.

To bond three of the sections 20 together so as to form the complete agitator 10, a suitable polyester cement may be applied to the radial walls 30 and the three sections may be assembled with the walls 30 abutting one another. Pressure may be applied to the three sections to complete the bond. Heat may also be employed in carrying out the bonding operation.

To reinforce the agitator 10 at the point where the washing machine drive shaft will engage the agitator, a ring 58 may be fitted over the upper end of the column 14 so that the bond between the sections 20 will be positively maintained at this point. The ring 58 may be made of metal or may be composed of a glass fiber reinforced plastic material. In the latter case, the ring will preferably be made up of a wrapping of the glass fiber material. The ring 58 may be pressed onto the upper end of the column 14 with the aid of heat, and in the case of a plastic ring, the heat will also tend to bond the ring to the column.

It will be understood that the sections 20 may be secured together mechanically or in any other suitable manner, the use of a bonding cement being cited above merely by way of example.

Since the draft of the mold cavity is radial rather than axial, the sections 20 may be molded with annular bead elements 60 which combine when the sections are assembled to form an annular bead 62 defining the desired water level in the tub of the washing machine. If desired, the words "water level" may also be molded in the outer surface of the sections 20. Because the prior molds for forming agitators in one piece necessarily have axial draft, it has heretofore been necessary to form such a water level mark by a separate hot scoring or marking operation.

The finished agitator 10 will have its outer surface entirely covered with the white Gel-Cote material and, hence, will present an extremely attractive appearance adding materially to the salability of the washing machine. Since the sections 20 are joined along planes bisecting the vanes, it will not be apparent to the average observer that the agitator was made in sections. Instead, the agitator will present the appearance of having been made in one piece.

In strength and durability, the agitator is unsurpassed by any of the prior agitators. Nevertheless, due to the low specific gravity and high strength of the glass fiber reinforced plastic material, the agitator is unusually light in weight. The greatly improved appearance and utility of the agitator more than justify the slight additional cost involved in forming the agitator in sections.

I claim:

1. A method of making a coated washing machine agitator of generally circular form, said method comprising molding a plurality of complementary individual sector-shaped sections, each of said sections being molded by providing a mold having a plurality of parts with respective molding surfaces, shaping said surfaces to correspond with a fraction of the agitator, orienting the mold with its molding surfaces generally horizontal, applying an initial continuous coating of a liquid resinous material to the molding surface of one part of the mold, adding a fibrous reinforcing material and a resinous body material to said coating, and bringing the parts of the mold together under heat and pressure to amalgamate the coating, the fibrous material, and the body material into an intimately bonded mass, assembling the complementary sections, and securing the complementary sections together to form a complete agitator having a continuously coated outer surface.

2. The method of making a generally circular coated washing machine agitator and having vanes, said method comprising molding a plurality of complementary sector-shaped sections constituting fractional elements of the agitator, each of said sections being molded by providing a two-part mold having lower and upper parts with respective molding surfaces, shaping said molding surfaces to correspond with a fraction of the agitator with half-vane elements, orienting said mold with said molding surface of said lower part generally horizontal, spraying an initial coating of a liquid resinous material onto the molding surface of the lower part of the mold, applying a glass fiber reinforcing mat over the coating, adding a resinous impregnant to the glass fiber mat, and forcing the parts of the mold together under pressure and at a molding temperature to amalgamate the coating, the glass fiber mat, and the impregnant into an intimately bonded mass, applying adhesive material to said complementary sections, assembling the complementary sections, and bonding the complementary sections together to form a complete agitator having a coated outer surface.

References Cited in the file of this patent

UNITED STATES PATENTS

| | | |
|---|---|---|
| Re. 16,743 | Rocke | Sept. 20, 1927 |
| 1,377,671 | Dieckmann | May 10, 1921 |
| 1,473,998 | Mixsell | Nov. 13, 1923 |
| 1,495,205 | Ruppel | May 27, 1924 |
| 1,819,208 | Staples | Aug. 18, 1931 |
| 1,914,273 | Meurling | June 13, 1933 |
| 2,150,454 | Nelson | Mar. 14, 1939 |
| 2,182,812 | Lougheed | Dec. 12, 1939 |
| 2,257,932 | Basler | Oct. 7, 1941 |
| 2,312,296 | Hempel | Feb. 23, 1943 |
| 2,334,859 | Beattie | Nov. 23, 1943 |
| 2,356,312 | Gerhardt | Aug. 22, 1944 |
| 2,454,200 | Perkins | Nov. 16, 1948 |
| 2,589,786 | Engel et al. | Mar. 18, 1952 |
| 2,613,397 | Borkland | Oct. 14, 1952 |